(12) United States Patent
Liao (10) Patent No.: US 10,327,587 B2
(45) Date of Patent: Jun. 25, 2019

(54) MULTIFUNCTIONAL FOOD ROASTER

(71) Applicant: Zhiwen Liao, Foshan (CN)

(72) Inventor: Zhiwen Liao, Foshan (CN)

(73) Assignee: Foshan Sixvector Design & Consultant Co., Ltd, Foshan, Guangdong (CN)

( * ) Notice: Subject to any disclaimer, the term of this patent is extended or adjusted under 35 U.S.C. 154(b) by 315 days.

(21) Appl. No.: 15/238,691

(22) Filed: Aug. 16, 2016

(65) Prior Publication Data

US 2018/0049587 A1 Feb. 22, 2018

(51) Int. Cl.
*A47J 37/06* (2006.01)
*A47J 37/04* (2006.01)

(52) U.S. Cl.
CPC ......... *A47J 37/0629* (2013.01); *A47J 37/043* (2013.01); *A47J 37/047* (2013.01)

(58) Field of Classification Search
CPC ........ A47J 37/04; A47J 37/06; A47J 37/0629; A47J 37/047; A47J 37/043
USPC ............................................. 219/419; 99/339
See application file for complete search history.

(56) References Cited

U.S. PATENT DOCUMENTS

| | | | | |
|---|---|---|---|---|
| 2,581,570 A * | 1/1952 | Amanatides | ..... | A47J 37/043 126/41 R |
| 5,539,184 A * | 7/1996 | Su | ..... | A47J 37/043 219/218 |
| 5,575,196 A * | 11/1996 | Masel | ..... | A47J 37/043 99/419 |
| 5,665,258 A * | 9/1997 | Hsu | ..... | A47J 37/043 219/386 |
| 5,845,563 A * | 12/1998 | Haring | ..... | A47J 37/043 99/419 |
| 5,855,164 A * | 1/1999 | Chiang | ..... | A21B 7/005 366/146 |
| 5,975,073 A * | 11/1999 | Kuo | ..... | A47J 37/0623 126/275 R |
| 6,199,473 B1 * | 3/2001 | Dotan | ..... | A47J 37/04 99/332 |
| 6,363,836 B1 * | 4/2002 | Usherovich | ..... | A47J 37/043 99/339 |
| 6,465,760 B1 * | 10/2002 | Wong | ..... | A47J 37/0623 219/398 |
| 9,000,332 B2 * | 4/2015 | Brown | ..... | B29C 65/1412 219/385 |

(Continued)

*Primary Examiner* — Brian W Jennison (57) ABSTRACT

Various embodiments of a multifunctional food roaster are provided. In one embodiment, it can be vertically-disposed and horizontally-disposed during roasting and processing, and is provided with an oven body component, a driving device, a roasting component, a heating device and a control system; the oven body component comprises a pedestal, an oven body and an upper cover which are mutually assembled and connected, the driving device is arranged in the pedestal, the heating device is arranged in the oven body, the roasting component is separately arranged in the oven body; the driving device and the heating device are connected to a power supply respectively through the control system, the roasting component is connected with and driven by the driving device to rotate in the oven body. The roaster can be used to roast and process various kinds of foods safely and evenly, and is also easier to be operated.

19 Claims, 7 Drawing Sheets

(56) References Cited

U.S. PATENT DOCUMENTS

2006/0225580 A1* 10/2006 Fernandez ............ A47J 37/041
99/419

* cited by examiner

MULTIFUNCTIONAL FOOD ROASTER

CROSS-REFERENCE TO RELATED APPLICATIONS

This application claims priority from Chinese Patent Application No. 201610241038.7, filed on Apr. 18, 2016, the contents of which are hereby incorporated by reference in their entirety for all purposes.

TECHNICAL FIELD

The present invention relates to a multifunctional food roaster.

BACKGROUND OF THE INVENTION

With the rapid development of social economy, the diversified to development of people's living needs and the pursuit of delight of life, various diversified foods enter ordinary families, and various industries, particularly various appliance products for roasting food, have gained the opportunity to develop rapidly accordingly.

For example, Chinese patent literature No. CN204839204U has disclosed a mini smokeless electric oven on Jul. 19, 2015, wherein a far infrared heating tube thereof is fixed in a lens shade through a heating tube fixing bracket, the lens shade and the far infrared heating tube are fixedly connected to the inside of an oven casing through a lens shade setscrew, a lens shade cushion block is located between the lens shade and the oven casing, the top of the oven casing is provided with an upper cover, a battening bar is fixedly connected to the upper cover through a screw, the middle of the upper cover is provided with a rectangle opening, and a rotary bracket is fixed in a right angle turnup of an oil receiving tank assembly. It is said that this structure can reduce smoked kebabs and is more beneficial to the health of people, which maximally protects the environment. However, the oven in this structure does not have a rotating function, and foods need to be turned and rotated ceaselessly by artificial means during an actual operation process, which makes it easy to scald user's hands, and thus threatens the body health, this is not beneficial for the user to use. Besides, rotating food manually also makes it difficult to heat food evenly. Therefore, the oven is necessary to be further improved.

SUMMARY OF THE INVENTION

To overcome the limits in the prior art, various embodiments of a multifunctional food roaster are provided to roast food safely, efficiently and evenly.

In one embodiment, the multifunctional food roaster is provided with both a vertically-disposed roasting and processing mode and a horizontally-disposed roasting and processing mode, and it comprises an oven body component, a driving device, a heating device and a control system, wherein the oven body component comprises a pedestal, an oven body and an upper cover which are mutually assembled and connected. The driving device is arranged in the pedestal, the heating device is arranged in the oven body, and the driving device and the heating device are respectively connected to a power supply through the control system. The oven body is separately provided with a roasting component for roasting and processing food, and the roasting component is connected to and driven by the driving device, thus it can rotate in the oven body. With the driving device, the roasting component can be driven to rotate at a constant speed, and with the heating device, cold air can be heated and hot air may be outputted to the roasting component, thus the food can be cooked evenly and effectively, and the conformity of degrees of ripeness of various foods placed in any position inside the roasting component is ensured accordingly.

In another embodiment, the bottom of the pedestal is provided with a support leg, and one side of an outer wall of the oven body is provided with a support leg rack. With the support leg and the support leg rack, the food roaster may roast and process food vertically-disposed and horizontally-disposed, which can replace the traditional single roasting and processing manner in a positive way. Furthermore, an oven body handle can also be provided on the other side of the outer wall of the oven body.

In another embodiment, the oven body arranged in the pedestal is cylindrical and is internally provided with a cavity, the roasting component is separately arranged in the cavity, and the upper cover is covered above the cavity and the roasting component.

In another embodiment, the control system comprises a timer and a timer knob switch as well as a temperature controller and a temperature controller knob switch, the timer and the timer knob switch are mutually matched and connected as well as the temperature controller and the temperature controller knob switch. The driving device is connected to a power supply through the timer knob switch and the heating device is connected to a power supply through the temperature controller knob switch. In this way, the security performance of the product can be improved, and meanwhile user may select time and temperature randomly to control the roasting and processing of the oven, which further improves user experience.

In another embodiment, the driving device arranged in the pedestal comprises a motor, a driving gear and a pivot, wherein the motor is mutually driven with the pivot through the driving gear. The bottom of the roasting component is provided with a pivot sleeve accordingly, and the roasting component is set over the pivot through the pivot sleeve, so that the roasting component can be driven to rotate in the cavity of the oven body. In the embodiment, the motor is matched and connected with the timer, and is connected to the power supply through the timer knob switch.

In one embodiment, the roasting component can be configured as a roasting barrel or a roasting rack, or can also be configured as comprising both. In the advantageous embodiment, the roasting component is configured as comprising both a roasting barrel and a roasting rack, and the roasting barrel and the roasting rack are separately arranged in the cavity in a replaceable manner. Therefore, the user can replace the roasting barrel and the roasting rack randomly according to the roasting and processing requirements of various foods, so that both the user experience and the practicability of the roaster can be improved.

To mutually drive with the pivot, the middle of the bottom of the roasting barrel is provided with a roasting barrel pivot sleeve, through which the roasting barrel is set over the pivot, so that the roasting barrel can rotate in the cavity of the oven body.

In some embodiments, the cavity of the oven body can be provided with a ball bearing that interacts with the roasting component. And in the specific embodiment, a side wall of the cavity is provided with the ball bearing accordingly, and the roasting barrel interacts with the ball bearing during rotating. Furthermore, the roasting barrel can be provided with a stirring convex rib in the inner wall advantageously.

To mutually drive with the pivot, the bottom of the roasting rack is provided with a roasting rack pivot sleeve, through which the roasting rack is set over the pivot, so that the roasting rack can rotate in the cavity of the oven body. And at the bottom of the roasting rack, an oil receiving tray can also be provided accordingly. In some advantageous embodiment, the bottom of the oil receiving tray is provided with a roasting rack roller, and the roasting rack interacts with the inner bottom of the cavity through the roasting rack roller during rotating.

In another embodiment, the upper cover which covered above the cavity and the roasting barrel is disk-shaped, and is provided with an air vent and an upper cover handle. The upper cover can advantageously be made of transparent armored glass.

In some advantageous embodiments, the roasting barrel is provided with a left-right symmetric roasting barrel handle at the upper end opening, wherein the left-right roasting barrel handle is respectively provided with a rotary buckle. Accordingly the upper cover is further provided with a wedge-shaped buckle, and the wedge-shaped buckle is buckled and fixed with the rotary buckle through downward pressing and rotating, thus it can prevent the oven body component and the roasting component from being easily opened during use.

In one embodiment, the heating device is an electric heating pipe component fixedly arranged in an inner wall of the oven body. The electric heating pipe component is matched and connected with the temperature controller, and is connected to a power supply through the temperature controller knob switch. In some advantageous embodiments, at least one group of the electric heating pipe component is provided, and is arranged in the side wall of the cavity of the oven body in an arc shape entirely.

Through the foregoing embodiments, a multifunctional food roaster is provided which has the characteristics of simple and rational structure, small entire volume, low manufacturing cost, flexible operation, safety and reliability, good oil receiving and discharging effects, high thermal efficiency, wide using range, and strong practicability, and can be widely applied to roast such food as beef, beefsteak, loin chop, chicken wing, drumstick, fish and chips, sausage, popcorn, whole chicken, or the like.

DETAILED DESCRIPTION

The present invention will be further described with reference to the drawings and embodiments hereinafter.

Figure 1:
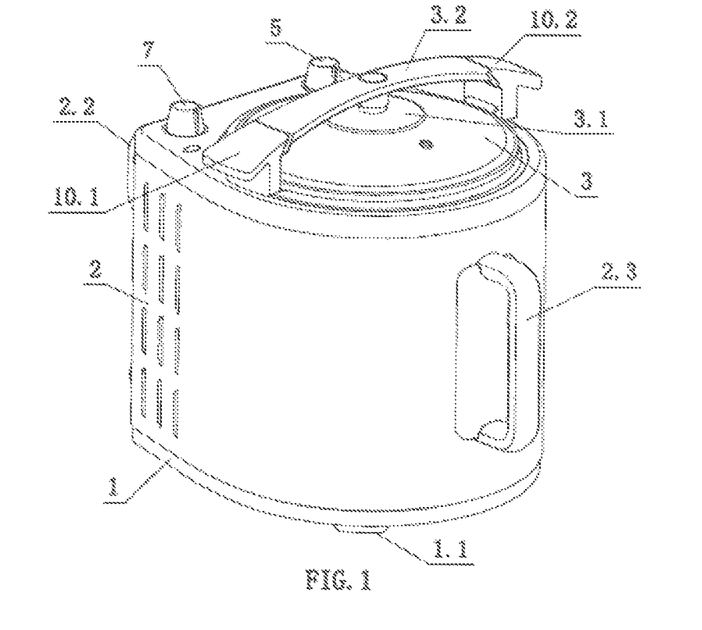
FIG. 1 is a structural schematic diagram illustrating a vertical usage state of a roasting barrel according to one embodiment of the present invention.
Figure 2:
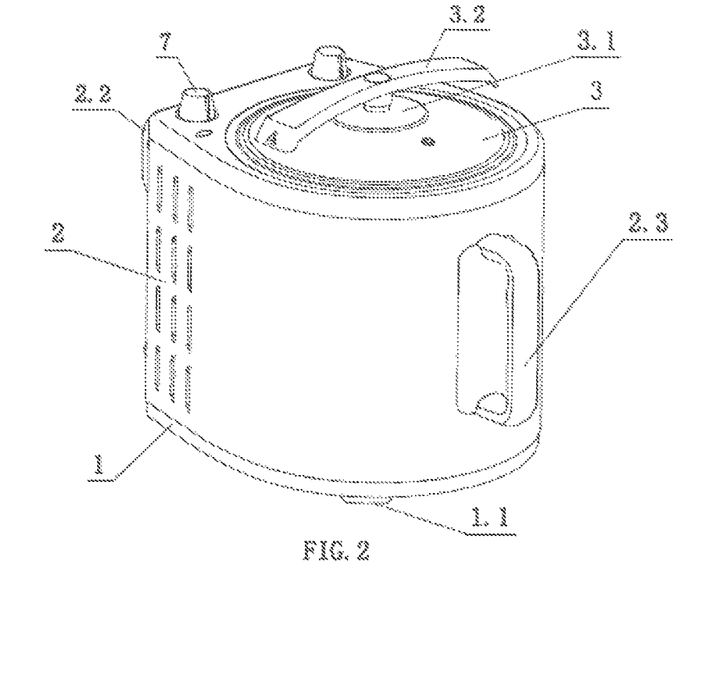
FIG. 2 is a structural schematic diagram illustrating a vertical usage state of a roasting rack according to one embodiment of the present invention.
Figure 6:
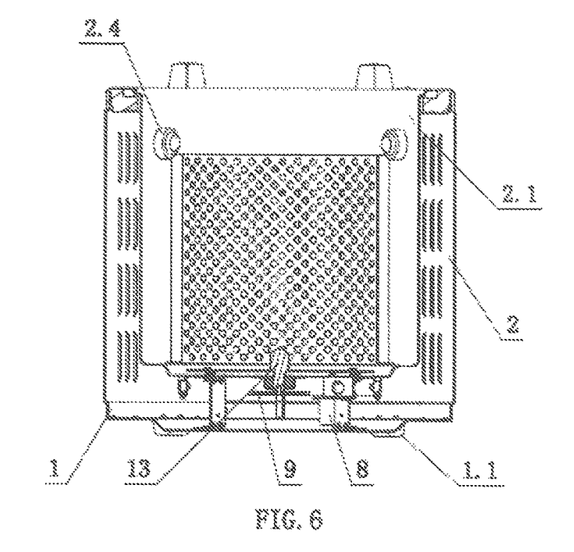
FIG. 6 is a schematic diagram illustrating a section structure of the oven body component according to one embodiment of the present invention.
Figure 7:
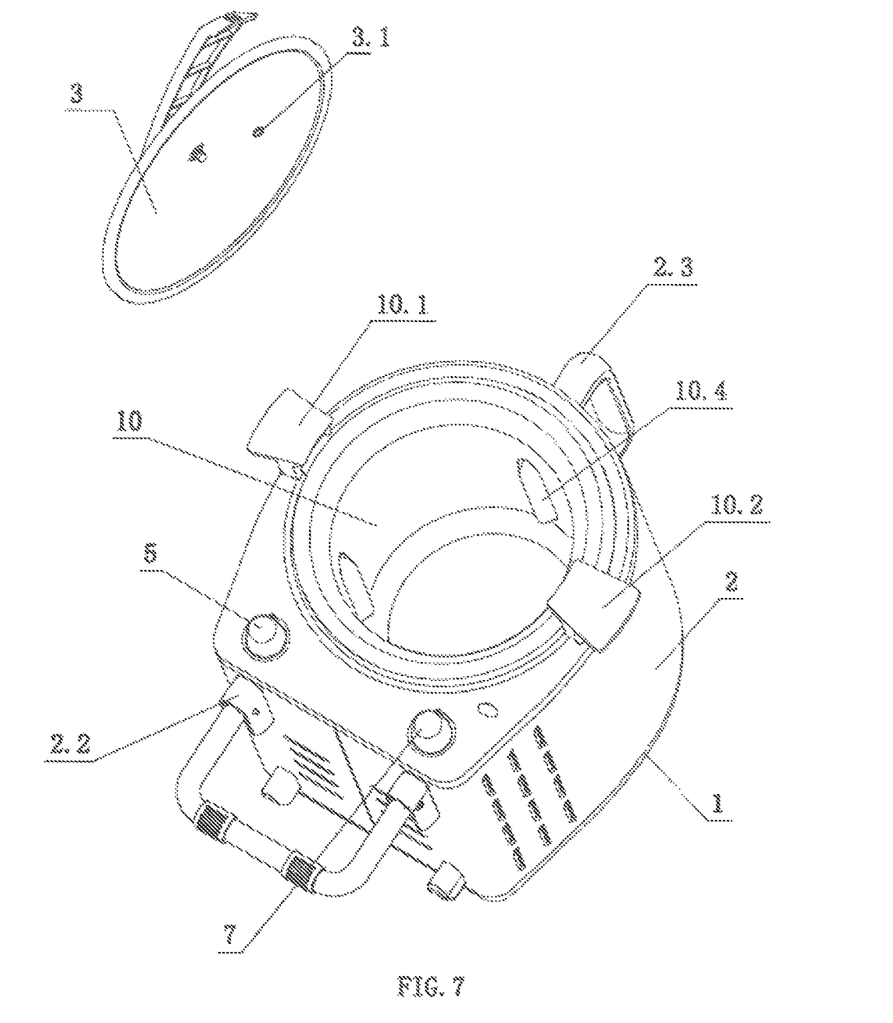
FIG. 7 is a schematic diagram illustrating a decomposition structure of the roasting barrel according to one embodiment of the present invention.
Figure 8:
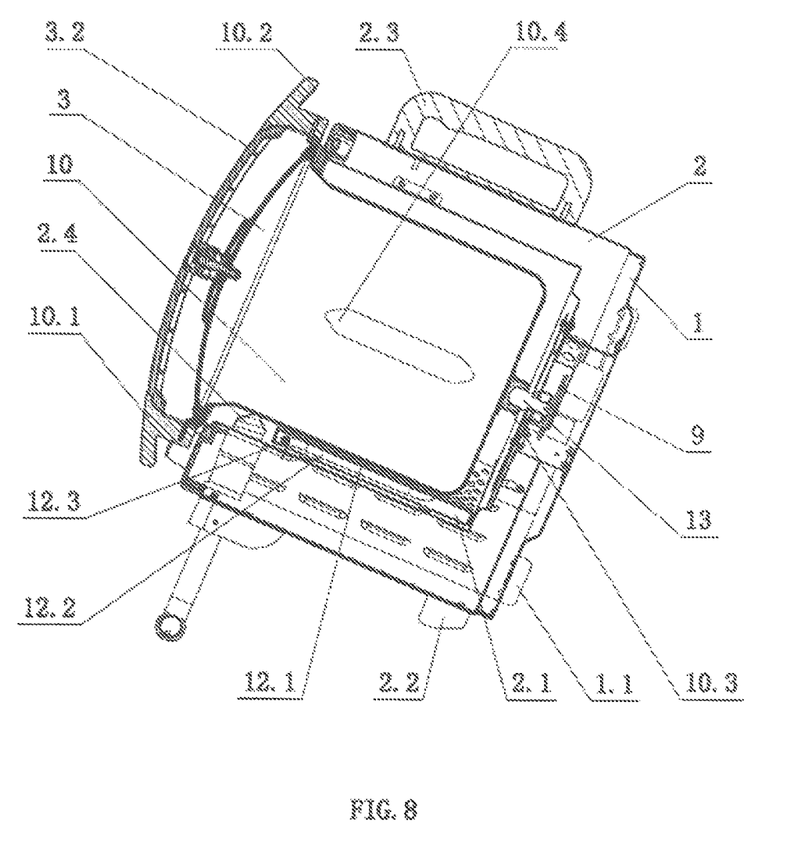
FIG. 8 is a schematic diagram illustrating an assembly section structure of the roasting barrel according to one embodiment of the present invention.
Figure 9:
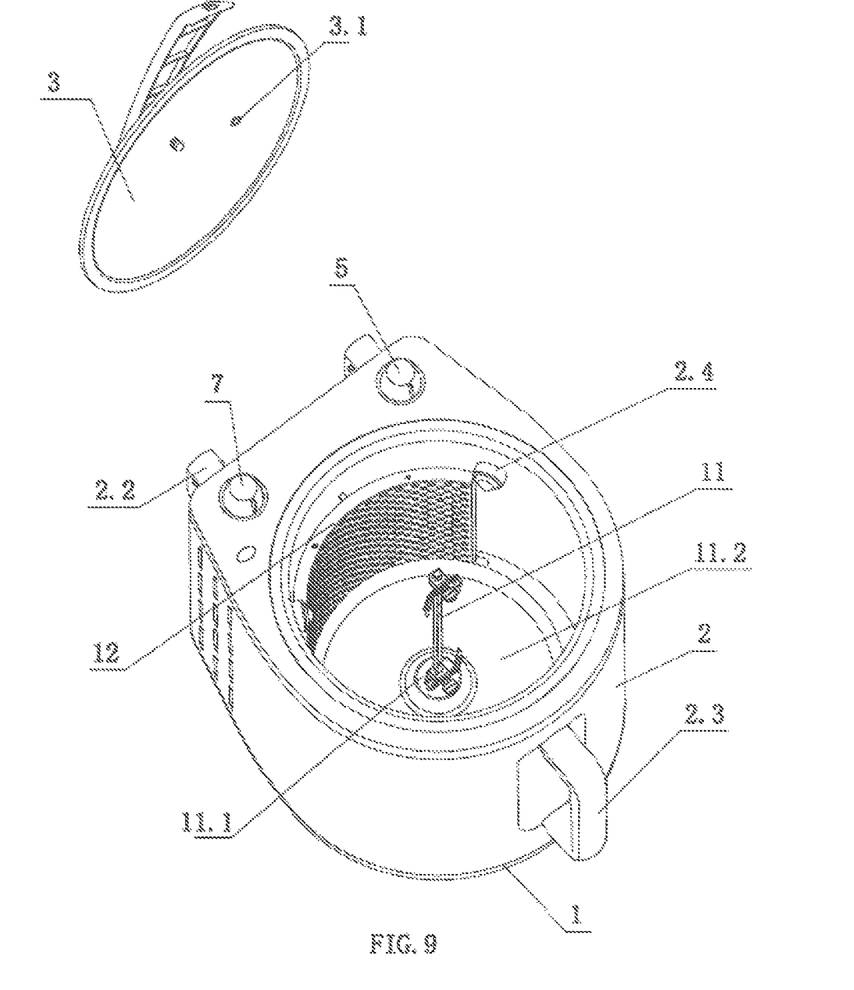
FIG. 9 is a schematic diagram illustrating a decomposition structure of the roasting rack according to one embodiment of the present invention.
Figure 10:
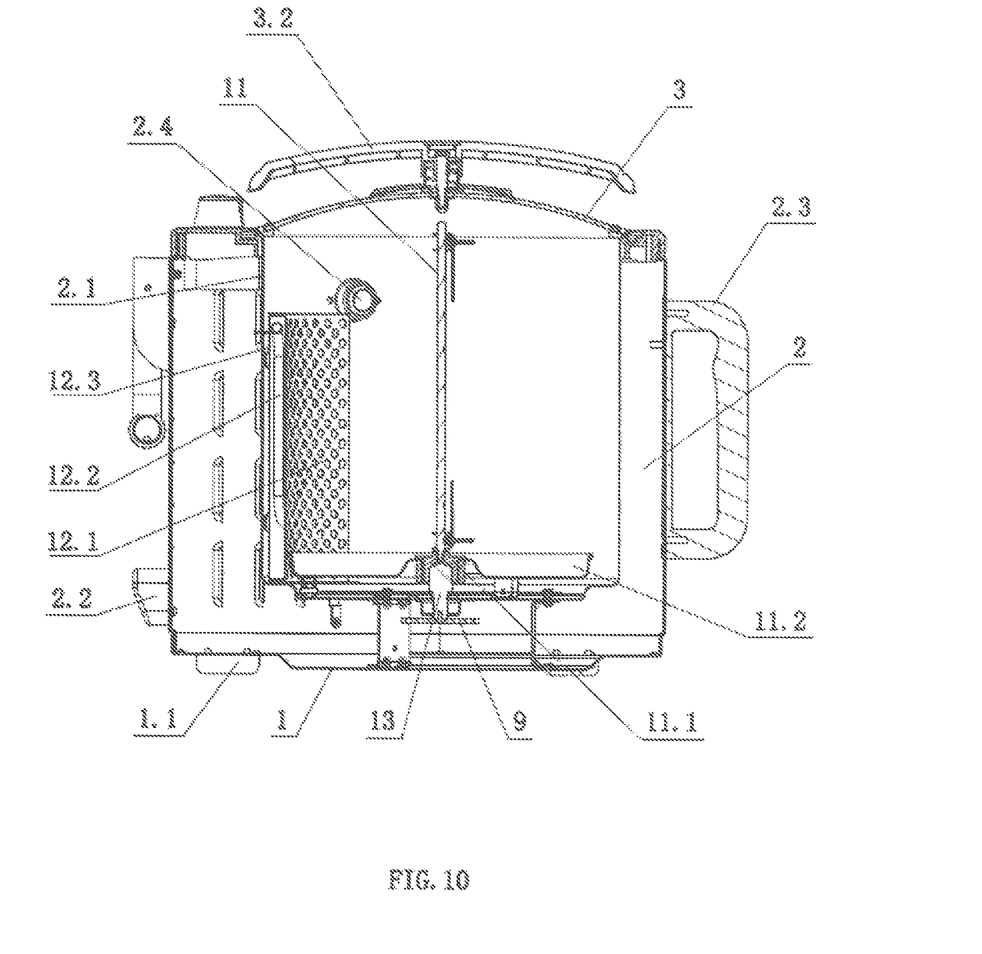
FIG. 10 is a schematic diagram illustrating an assembly section structure of the roasting rack according to one embodiment of the present invention.

FIGS. 1 and 2 illustrate two different embodiments of the food roaster which differ in that the roasting component is configured differently. FIG. 1 illustrates a configuration that the roasting component is as a roasting barrel 10 in place of a roasting rack 11 in FIG. 3. FIGS. 7 and 8 illustrate a detail description of the roasting barrel 10 and its arrangements included therein in FIG. 1. FIGS. 9 and 10 illustrate a detail description of the roasting rack 11 and its arrangements included therein in FIG. 2. The description of other arrangements as shown in FIG. 3 to 6 furthermore applies to the embodiments in FIGS. 1 and 2.

The multifunctional food roaster in the embodiments can roast and process food both vertically-disposed and horizontally-disposed. And it comprises an oven body component, a driving device, a heating device and a control system, wherein the oven body component comprises a pedestal 1, an oven body 2 and an upper cover 3 which are mutually assembled and connected. The driving device is arranged in the pedestal 1, the heating device is arranged in the oven body 2. The oven body 2 is separately provided with a roasting component for roasting and processing food, the roasting component is driven by and connected to the driving device, and rotates in the oven body 2. The control system comprises a time controlling unit and a temperature controlling unit, and in some embodiments the time controlling unit can comprise a timer and a timer knob switch 5 which are mutually matched and connected, in the same way the temperature controlling unit can comprise a temperature controller 6 and a temperature controller knob switch 7 which are mutually matched and connected. The driving device and the heating device are connected to a power supply respectively through the control system, specifically the driving device is connected to a power supply through the timer knob switch 5 and the heating device is connected to a power supply through the temperature controller knob switch 7.

In some embodiments, the oven body 2 is cylindrical and is arranged in the pedestal 1, and it is internally provided with a cavity 2.1. The roasting component can be separately arranged in the cavity 2.1 advantageously, and the upper cover 3 is covered above the cavity 2.1 and the roasting component accordingly.

Figure 3:
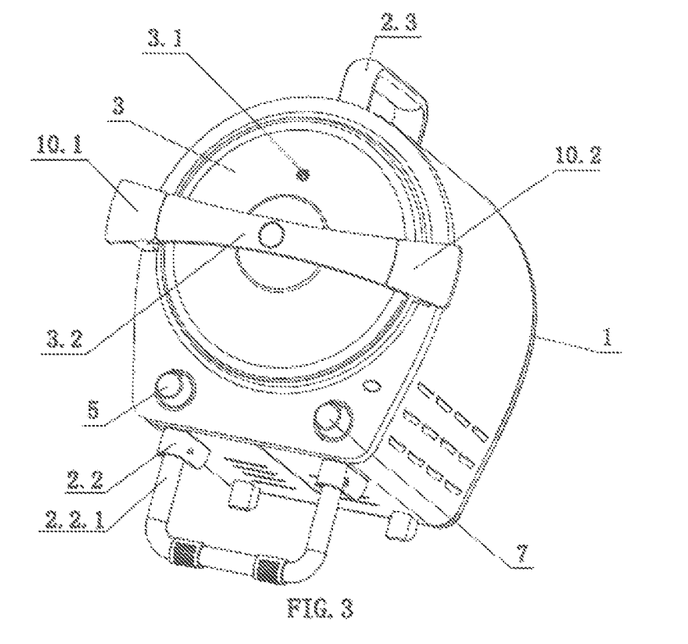
FIG. 3 is a structural schematic diagram illustrating a horizontal usage state of the roasting barrel according to one embodiment of the present invention.
Figure 4:
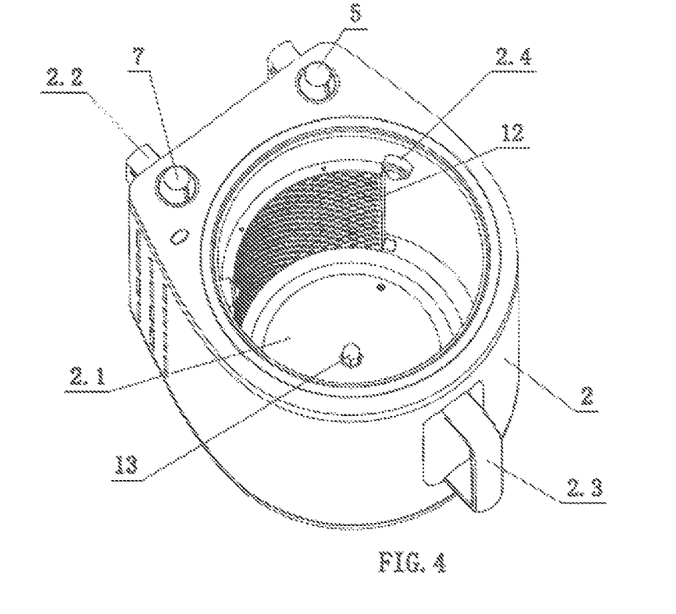
FIG. 4 is a schematic diagram illustrating an interior structure of an oven body component according to one embodiment of the present invention.

Further, the bottom of the pedestal 1 is provided with a support leg 1.1. And in some advantageous embodiments the oven body 2 is provided with a support leg rack 2.2, a foldable support rod 2.2.1 and a rear support leg on one side of the outer wall, in which the foldable support rod 2.2.1 is connected to the support leg rack 2.2 through a hinge structure. The food roaster implements the vertically-disposed roasting and processing and/or horizontally-disposed roasting and processing respectively through the support leg 1.1, the support leg rack 2.2 and the foldable support rod 2.2.1. The other side of the outer wall of the oven body 2 is further provided with an oven body handle 2.3 in some embodiments.

Figure 5:
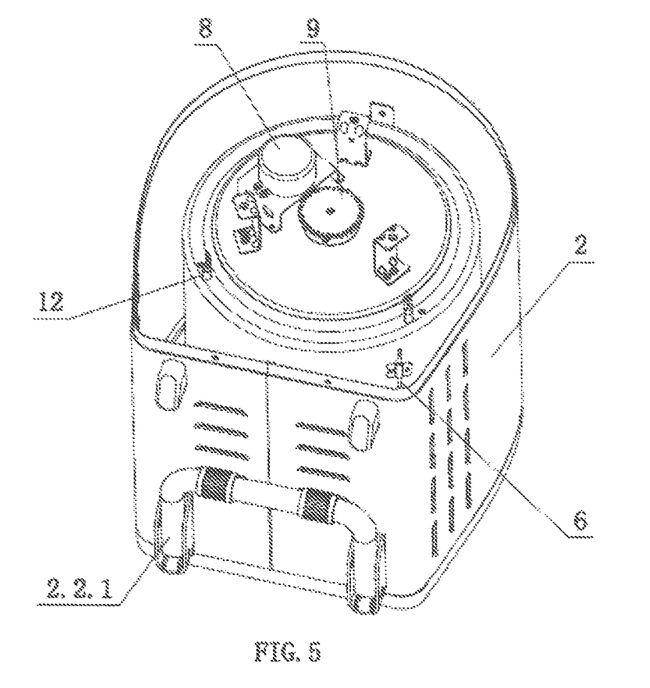
FIG. 5 is a schematic diagram illustrating a bottom structure of the oven body component according to one embodiment of the present invention.

As evident from FIG. 5 the driving device is arranged in the pedestal 1 and comprises a motor 8, a driving gear 9 and a pivot 13, wherein the motor 8 is matched and connected with the timer, and is connected to the power supply through the timer knob switch 5, and the motor 8 is mutually driven with the pivot 13 through the driving gear 9. Accordingly, the bottom of the roasting component is provided with a pivot sleeve, and is mutually driven with the pivot 13 through the pivot sleeve, so that the roasting component rotates in the cavity 2.1 of the oven body 2. Furthermore, the cavity 2.1 of the oven body 2 is provided with a ball bearing 2.4 that interacts with the roasting component.

As a particularly advantageous embodiment, the roasting component comprises both a roasting barrel 10 and a roasting rack 11, and the roasting barrel 10 and the roasting rack 11 are separately arranged in the cavity 2.1 in a replaceable manner.

In an embodiment that the roasting component is configured as a roasting barrel 10, the middle of the bottom of the roasting barrel 10 is provided with a roasting barrel pivot sleeve 10.3, the roasting barrel 10 is mutually driven with the pivot 13 through the roasting barrel pivot sleeve 10.3. In an optional embodiment, a side wall of the cavity 2.1 is provided with the ball bearing 2.4, and the roasting barrel 10 interacts with the ball bearing 2.4 during rotating. A stirring convex rib 10.4 can also be provided in an inner wall of the roasting barrel 10 in one optional embodiment.

In the arrangement of roasting rack, the bottom of the roasting rack 11 is provided with a roasting rack pivot sleeve 11.1, and is mutually driven with the pivot 13 through the roasting rack pivot sleeve 11.1. Accordingly, in this embodiment the bottom of the roasting rack 11 is further provided with an oil receiving tray 11.2. As one optional embodiment, the bottom of the oil receiving tray 11.2 can be provided with a roasting rack roller 11.3 through which the roasting rack 11 may interact with the inner bottom of the cavity 2.1 during rotating.

The upper cover 3 covered above the cavity 2.1 and the roasting barrel 10 is disk-shaped, and is provided with an air vent 3.1 and an upper cover handle 3.2. In some advantageous embodiments, the upper cover 3 is further provided with a wedge-shaped buckle, accordingly the roasting barrel 10 is provided with a left-right symmetric roasting barrel handle 10.1 at the upper end opening, and the left-right roasting barrel handle 10.1 is respectively provided with a rotary buckle 10.2. The upper cover 3 enables the wedge-shaped buckle to be mutually buckled and fixed with the rotary buckle 10.2 of the roasting barrel 10 through downward pressing and rotating. Advantageously the upper cover 3 is made of transparent armored to glass.

The heating device can be configured as an electric heating pipe component 12 which comprises an electric heating pipe cover 12.1, an electric heating pipe 12.2 and an electric heating pipe bracket 12.3, and is fixedly arranged in an inner wall of the oven body 2. The electric heating pipe 12.2 in the electric heating pipe component 12 is matched and connected with the temperature controller 6, and is connected to a power supply through the temperature controller knob switch 7.

In some embodiments, at least one group of the electric heating pipe component 12 is configured, in particular in an arc shape entirely.

The above shows and describes the fundamental principles, major characteristics and advantages of the present invention. Those skilled in the art shall understand that the present invention is not limited by the foregoing embodiments, and the foregoing embodiments and description only explain the principles of the present invention. The present invention may also have various modifications and improvements without departing from the spirit and scope of the present invention, these various modifications and improvements shall all fall within the protection scope of the present invention claimed which is defined by the appended claims and equivalents thereof.

I claim:

1. A multifunctional food roaster, comprising both a vertically-disposed roasting and processing mode and a horizontally-disposed roasting and processing mode; and comprising an oven body component, an roasting component, a driving device, a heating device and a control system; wherein the oven body component comprises a pedestal, an oven body and an upper cover which are mutually assembled and connected, the driving device is arranged in the pedestal, the heating device is arranged in the oven body, and the roasting component is separately arranged in the oven body;

the driving device and the heating device are respectively connected to a power supply through the control system, and the roasting component is connected with and driven by the driving device to rotate in the oven body;

wherein the pedestal is provided with a support leg at the bottom, and the oven body is provided with a support leg rack, a foldable support rod and a rear support leg on one side of an outer wall, wherein the foldable support rod is connected to the support leg rack through a hinge structure.

2. The multifunctional food roaster according to claim 1, wherein the control system comprising a time controlling unit and a temperature controlling unit, the driving device is connected with the time controlling unit, and the heating device is connected with the temperature controlling unit.

3. The multifunctional food roaster according to claim 2, wherein the time controlling unit comprises a timer and a timer knob switch which are mutually matched and connected, the temperature controlling unit comprises a temperature controller and a temperature controller knob switch which are mutually matched and connected;

the driving device is connected to a power supply through the time knob switch, the heating device is connected to a power supply through the temperature controller knob switch.

4. The multifunctional food roaster according to claim 3, wherein the driving device comprises a motor, a driving gear and a pivot, in which the motor is mutually driven with the pivot through the driving gear;

the bottom of the roasting component is provided with a pivot sleeve, and the roasting component is set over the pivot through the pivot sleeve, so that the roasting component rotates in the oven body;

the motor is matched and connected with the timer, and is connected to the power supply through the time knob switch.

5. The multifunctional food roaster according to claim 4, wherein the oven body is cylindrical and internally provided with a cavity, the roasting component is separately arranged in the cavity, and the upper cover is covered above the cavity and the roasting component.

6. The multifunctional food roaster according to claim 5, wherein the roasting component comprises a roasting barrel and a roasting rack, the roasting barrel and the roasting rack are separately arranged in the cavity in a replaceable manner.

7. The multifunctional food roaster according to claim 6, wherein the roasting component is configured as a roasting barrel, which is provided with a left-right symmetric roasting barrel handle at an upper end opening and a roasting barrel pivot sleeve at the middle of the bottom;
the roasting barrel is set over the pivot through the roasting barrel pivot sleeve, so that the roasting barrel rotates in the cavity of the oven body.

8. The multifunctional food roaster according to claim 7, wherein the roasting barrel is further provided with a stirring convex rib in the inner wall.

9. The multifunctional food roaster according to claim 8, wherein a ball bearing is arranged in a side wall of the cavity and the roasting barrel interacts with the ball bearing during rotating.

10. The multifunctional food roaster according to claim 9, wherein the upper cover covered above the cavity and the roasting barrel is provided with a wedge-shaped buckle;
the left-right roasting barrel handle is respectively provided with a rotary buckle;
the wedge-shaped buckle and the rotary buckle are configured to be mutually buckled and fixed with each other through downward pressing and rotating.

11. The multifunctional food roaster according to claim 10, wherein the upper cover is disk-shaped and further provided with an air vent and an upper cover handle.

12. The multifunctional food roaster according to claim 6, wherein the roasting component is configured as a roasting rack, which is provided with a roasting rack pivot sleeve and an oil receiving tray at the bottom;
the roasting rack is set over the pivot through the roasting rack pivot sleeve so that it is driven by the pivot to rotate in the cavity.

13. The multifunctional food roaster according to claim 12, wherein the oil receiving tray is provided with a roasting rack roller at the bottom, and the roasting rack interacts with the inner bottom of the cavity through the roasting rack roller during rotating.

14. The multifunctional food roaster according to claim 13, wherein the heating device, which is configured as an electric heating pipe component comprising an electric heating pipe cover, an electric heating pipe and an electric heating pipe bracket, is fixedly arranged in an inner wall of the oven body;
the electric heating pipe is matched and connected with the temperature controller, and is connected to a power supply through the temperature controller knob switch.

15. The multifunctional food roaster according to claim 14, wherein at least one group of the electric heating pipe component is configured in a side wall of the cavity of the oven body, in particular in an arc shape entirely.

16. The multifunctional food roaster according to claim 13, wherein the heating device, which is configured as an electric heating pipe component comprising an electric heating pipe cover, an electric heating pipe and an electric heating pipe bracket, is fixedly arranged in an inner wall of the oven body;
the electric heating pipe is matched and connected with the temperature controller, and is connected to a power supply through the temperature controller knob switch.

17. The multifunctional food roaster according to claim 16, wherein at least one group of the electric heating pipe component is configured in a side wall of the cavity of the oven body, in particular in an arc shape entirely.

18. The multifunctional food roaster according to claim 3, wherein the heating device, which is configured as an electric heating pipe component comprising an electric heating pipe cover, an electric heating pipe and an electric heating pipe bracket, is fixedly arranged in an inner wall of the oven body;
the electric heating pipe is matched and connected with the temperature controller, and is connected to a power supply through the temperature controller knob switch.

19. The multifunctional food roaster according to claim 4, wherein the heating device, which is configured as an electric heating pipe component comprising as electric heating pipe cover, an electric heating pipe and an electric heating pipe bracket, is fixedly arranged in an inner wall of the oven body;
the electric heating pipe is matched and connected with the temperature controller, and is connected to a power supply through the temperature controller knob switch.

\* \* \* \* \*